United States Patent
Wen et al.

(10) Patent No.: US 11,581,736 B2
(45) Date of Patent: Feb. 14, 2023

(54) METHOD AND SYSTEM FOR EVALUATING INERTIA OF POWER SYSTEM AND STORAGE MEDIUM

(71) Applicant: Hunan University, Changsha (CN)

(72) Inventors: Yunfeng Wen, Changsha (CN); Wuqi Zhang, Changsha (CN); Wei Guo, Changsha (CN)

(73) Assignee: Hunan University, Changsha (CN)

( * ) Notice: Subject to any disclaimer, the term of this patent is extended or adjusted under 35 U.S.C. 154(b) by 0 days.

(21) Appl. No.: 17/873,855

(22) Filed: Jul. 26, 2022

(65) Prior Publication Data

US 2022/0368133 A1    Nov. 17, 2022

(51) Int. Cl.
*H02J 3/24* (2006.01)

(52) U.S. Cl.
CPC .......... *H02J 3/241* (2020.01); *H02J 2203/10* (2020.01); *H02J 2203/20* (2020.01)

(58) Field of Classification Search
None
See application file for complete search history.

(56) References Cited

U.S. PATENT DOCUMENTS

| | | | | |
|---|---|---|---|---|
| 9,501,803 | B2 * | 11/2016 | Bilac | H02J 13/00006 |
| 2002/0175522 | A1 * | 11/2002 | Wacknov | H02P 9/30 |
| | | | | 290/52 |
| 2017/0250540 | A1 * | 8/2017 | Varma | H02J 3/46 |
| 2018/0062390 | A1 | 3/2018 | Parashar et al. | |
| 2021/0164442 | A1 | 6/2021 | Bonfiglio et al. | |

FOREIGN PATENT DOCUMENTS

| | | |
|---|---|---|
| CN | 111293686 A | 6/2020 |
| CN | 112434936 A | 3/2021 |
| CN | 112787326 A | 5/2021 |
| CN | 112886638 A | 6/2021 |

OTHER PUBLICATIONS

Wuqi Zhang et al.; Research Framework and Prospect on Power System Inertia Estimation; "Proceedings of the CSEE", vol. 41 No. 20, Oct. 20, 2021; College of Electrical and Information Engineering, Hunan University, Changsha 410082, Hunan Province, China.
(Continued)

*Primary Examiner* — Jared Fureman
*Assistant Examiner* — Joel Barnett

(57) ABSTRACT

A method and a system for evaluating inertia of a power system and a storage medium. The method includes: injecting a cosine active power disturbance into the power system by small-disturbance injection, and obtaining frequency response at a node where the disturbance is injected, where the active power disturbance can be an energy storage, wind power, or photovoltaic power; acquiring an evaluation framework of inertia and frequency regulation capability of the power system according to relative characteristics of a frequency response function; and constructing a mathematical relationship between the impedance and frequency response characteristics according to a relationship among active power disturbance, frequency fluctuation and impedance.

6 Claims, 8 Drawing Sheets

(56) References Cited

OTHER PUBLICATIONS

Bo Wang et al.; Review of Research on Power System Inertia Related Issues in the Context of High Penetration of Renewable Power Generation; "Power System Technology", Aug. 2020, vol. 44 (Issue 8); School of Electrical Engineering, Northeast Electric Power University, Jilin 132012, Jilin Province, China.

Youqiang Xiao et al.; A Framework for Assessing the Inertia Distribution of Power Systems; "2019 IEEE 3rd Conference on Energy Internet and Energy System Integration (EI2)", Nov. 8-10, 2019; Changsha, China.

Yunjie Gu et al.; Impedance-Based Whole-System Modeling for a Composite Grid via Embedding of Frame Dynamics; "IEEE Transactions on Power Systems", 2020, vol. 36 (Issue 1).

\* cited by examiner

METHOD AND SYSTEM FOR EVALUATING INERTIA OF POWER SYSTEM AND STORAGE MEDIUM

CROSS-REFERENCE TO RELATED APPLICATIONS

This application claims the benefit of priority from Chinese Patent Application No. 202110933864.9, filed on Aug. 16, 2021. The content of the aforementioned application, including any intervening amendments thereto, is incorporated herein by reference in its entirety.

TECHNICAL FIELD

This application relates to operation control of power systems, and more particularly to a method and a system for evaluating inertia of a power system and a storage medium.

BACKGROUND

As fossil energy sources are continuously exploited and the carbon emission standard becomes increasingly stringent, power systems dominated by conventional synchronous power sources is gradually replaced with those dominated by non-synchronous power sources, such as wind and photovoltaic. Considering that the power system plays a predominant role in the carbon emission, it is required to shut down a large number of power systems using fossil energy to achieve the "carbon peak and carbon neutrality goals". In view of this, the number and capacity of non-synchronous power sources such as wind and photovoltaic power sources connected to the power grid through power electronic converters will continue to grow rapidly. Moreover, due to the mutual decoupling between the non-synchronous power source and the grid frequency, it fails to actively provide inertia support for the power system under active power disturbances, resulting in attenuation of the inertia level of the power system and deterioration of anti-disturbance capacity and frequency stability of the power system, which poses a challenge to the safe and stable operation of the low-inertia power system.

Currently, the inertia and frequency regulation capability of the power system are evaluated mainly by large-disturbance event-dependent offline evaluation and phasor measurement unit (PMU)-based online identification. Unfortunately, these methods commonly struggle with low accuracy, large data demand and poor robustness, and are not suitable for the analysis of the normal state and small disturbance. Moreover, they also fail to effectively reflect the contribution of the "generation-grid-load-storage" diversified virtual inertia resources to the inertia and frequency regulation capability of the power system. Thus, how to accurately evaluate the inertia of the power system and the frequency regulation capability of each node under normal operation, precisely regulate the inertia and frequency regulation capability of the power system according to the evaluation results, and formulate prevention and emergency control strategies in advance to enhance the capability of the power grid to resist the large-capacity active-power impacts, such as high voltage direct current (HVDC) mono-pole/bi-pole block and the disconnection of new energy, is still a great challenge for the low-inertia power system.

SUMMARY

An objective of this application is to provide a method and a system for evaluating inertia of a power system and a storage medium to overcome the defects in the existing technologies. This application eliminates the dependence on large-disturbance events, and can equivalently characterize the system frequency response characteristic merely based on impedance response.

Technical solutions of this application are described as follows.

In a first aspect, this application provides a method for evaluating inertia of a power system, comprising:

(S1) injecting active power disturbance signals varying in frequency into the power system at a node in a power grid, wherein at time t, the active power disturbance signals are each expressed as:

$$P(t)=P_0+P_m \cos(2\pi f_r t+\varphi_p);$$

wherein $P_0$ is an output power of a non-synchronous power supply under normal operation; $P_m$ is a magnitude of a cosine term $P_m \cos(2\pi f_r t+\varphi_p)$ of the active power disturbance; $\varphi_p$ is a phase angle of the cosine term $P_m \cos(2\pi f_r t+\varphi_p)$ of the active power disturbance; and $f_r$ is a disturbance frequency of the active power disturbance; and acquiring a first frequency response function FR(s) of the power system at a point of common coupling (PCC) where the active power disturbance is injected according to Fourier transform; or equivalently characterizing a second frequency response function FR(s) of the power system according to impedance response;

(S2) acquiring a Bode diagram of the first frequency response function FR(s) or the second frequency response function FR(s) to obtain a resonance point and a direct current (DC) gain $K_{DC\_gain}$; and determining an inertia and frequency regulation capability according to the resonance point and the DC gain $K_{DC\_gain}$.

With regard to the method provided herein, by means of energy storage equipment or wind or photovoltaic power units, a cosine active power disturbance is injected into the power system to obtain frequency response characteristics of the power system through an appropriate control strategy, so as to propose an evaluation framework of the inertia and frequency regulation capability of the power system. Based on the evaluation framework, a non-intrusive equivalent frequency response model is established based on the impedance response of the PCC to evaluate the inertia level of the power system and the frequency regulation capability of various power-supply units without the need for large-disturbance events or PMU-based parameter identification. This application provides a reference for the precise regulation of the inertia and frequency regulation capability of the low-inertia power system, and can effectively prevent the system instability caused by low inertia level and insufficient frequency regulation capability under the exposure to the large-capacity active-power impact such as HVDC monopole/bi-pole block and disconnection of new energy, ensuring the safe and stable operation of the low-inertia power system.

In step (S1), the active power disturbance signals are injected into the power system by using a non-synchronous power supply, wherein the active power disturbance has a double-loop control structure; an outer loop of the double-loop control structure is configured to perform a power control, wherein a power control model is expressed as $$i_{dref} = \frac{2P_{ref}}{3u_{sd}},$$

and $i_{qref}=0$; an inner loop of the double-loop control structure is configured to perform a current control, wherein a current control model is expressed as $i_d(s)=G_i(s)i_{dref}$; the phase-locked loop is achieved by q-axis phase-locking, wherein a relation between an output angle of the phase-locked loop and an input q-axis voltage is expressed as $$\Delta\theta_{PLL}(s) = \frac{H_{PLL}(s)/s}{1+U_1 H_{PLL}(s)/s} u_{sq};$$

wherein $P_{ref}$ is a reference value of an input active power disturbance, $i_{dref}$ is a d-axis current reference value, and $i_{qref}$ is a q-axis current reference value; $G_i(s)$ is the closed-loop gain of the current control; $H_{PLL}(s)$ is the transfer function of the phase-locked loop; $s=j2\pi f_r$; $U_1$ is the grid voltage at the PCC; $u_{sd}$ is the d-axis component of the grid voltage at the PCC; $u_{sq}$ is a q-axis component of the grid voltage at the PCC; and $\Delta\theta_{PLL}(s)$ is an angle variation of the grid voltage at the PCC (A real-time grid voltage is obtained by allowing the input voltage to pass through a proportional integral (PI) controller).

In step (S1), the non-synchronous power supply based on renewable energy source or energy storage using power electronic converters is taken as the active power disturbance, which is not only flexible to arrange disturbance injection positions, but also easy to modify the control strategies due to the flexible control of the power electric converters. This facilitates the injection of the required cosine active power disturbance into the power system to be evaluated.

In step (S1), the first frequency response function FR(s) is expressed as $FR(s)\equiv F[f_r]/P[f_r]$; wherein $s=j2\pi f_r$; $F[f_r]=0.5f_m \exp(j\varphi_f)$; $P[f_r]=0.5P_m \exp(j\varphi_p)$; $F[f_r]$ is a Fourier component corresponding to a frequency f(t) at the PCC under the disturbance frequency $f_r$; $P[f_r]$ is a Fourier component corresponding to an active power disturbance P(t) under the disturbance frequency $f_r$; and $f(t)=f_0+f_m \cos(2\pi f_r t+\varphi_f)$, wherein $f_0$ is a rated frequency (50/60 Hz) of the power system under normal operation, $f_m$ is an magnitude of a frequency cosine term $f_m \cos(2\pi f_r t+\varphi_1)$, $\varphi_f$ is a phase angle of a frequency cosine term $f_m \cos(2\pi f_r t+\varphi_f)$, $P_m$ is the magnitude of the cosine term $P_m \cos(2\pi f_r t+\varphi_p)$ of the active power disturbance, $\varphi_p$ is the phase angle of the cosine term $P_m \cos(2\pi f_r t+\varphi_p)$ of the active power disturbance.

In step (S1), the second frequency response function FR(s) is expressed as $$FR(s) \equiv \frac{s}{2\pi u_{sd}} T_{PLL}(s) G_i(s) \frac{1}{u_{sd}} Z_{qd}(s); FR(s) \approx \frac{3s}{2\pi u_{sd}^2} Z_{qd}(s), f_r < f_{PLL\_BW},$$

wherein $$T_{PLL}(s) = \frac{U_1 H_{PLL}(s)}{s+U_1 H_{PLL}(s)}, Z_{qd}(s)$$

is a coupling impedance between a q-axis and a d-axis of the power system in a dq reference frame of the power system at the PCC, $G_i(s)$ is the closed-loop gain of the current control, $H_{PLL}(s)$ is a transfer function of a phase-locked loop; $s=j2\pi f_r$; $u_{sd}$ is a d-axis component of a grid voltage at the PCC; $f_{PLL\_BW}$ indicates phase-locked loop bandwidth; and $U_1$ is the grid voltage at the PCC.

With regard to the method provided herein, a mathematical expression of the frequency response characteristics based on the impedance is obtained by a coupling relationship between the active power disturbance, frequency fluctuation and impedance and the converter control block diagram, so as to transform the inertia and frequency regulation capability of the evaluation system/device into an impedance response of the power system. Thus, the inertia level of the power system and the frequency regulation capability of various kinds of power-supply units are allowed to be reliably evaluated without needing large disturbance events or parameter identification of measurement data obtained by PMU, laying foundations for the precise regulation of the inertia and frequency regulation capability of the power system, thereby effectively enhancing the ultimate bearing capacity of the non-synchronous power supply of the power system.

In step (S2), the inertia level $H_{sys}$ of the power system is determined through the following formulas:

$$C_{eq}^H \cdot \frac{df}{dt} = \Delta P \text{ and } \frac{2H_{sys}S_{sys}}{f_0} \cdot \frac{df}{dt} = \Delta P;$$

wherein $S_{sys}$ is a rated capacity of the power system; and $C_{eq}^H$ is an equivalent capacitance characterized by an inertia of the power system. The resonance point characterizes the inertia of the power system as the equivalent capacitance $C_{eq}^H$, and then the equivalent capacitance $C_{eq}^H$ is subjected to calculation combining the system parameters and the resonance frequency. The calculation is simple, and the results are reliable.

The step (S2) further comprises:

evaluating frequency regulation capability of the power system according to the DC gain $K_{DC\_gain}$, wherein a quasi-stable-state frequency deviation $\Delta f_{ss}$ of the power system is expressed as $\Delta f_{ss}=K_{DC\_gain}*\Delta P$, wherein $\Delta P$ is an unbalanced active power of the power system. Combined with the DC gain $K_{DC\_gain}$, a calculation mode of the frequency regulation capability of the power system basing on the DC gain $K_{DC\_gain}$ is obtained, effectively improving the existing evaluation methods that can only obtain accurate frequency regulation capability of the power system through a large amount of simulation calculations. The method provided herein only requires to obtain the DC gain $K_{DC\_gain}$ of the frequency response of the power system, such that the frequency regulation capability of the power system can be evaluated, providing the basis and reference for the power system dispatching personnel to adjust the operation mode or control strategy in time to cope with the decreasing inertia level of the power system impacted by the large-capacity active power disturbance.

In a second aspect, this method provides a system for evaluating inertia of a power system, comprising a computer device, wherein the computer device is configured or programmed to perform the steps of evaluating the inertia in the method mentioned above.

In a third aspect, this application provides a system for evaluating inertia of a power system, comprising a computer device, wherein the computer device is configured or programmed to perform the steps of evaluating the frequency regulation capability in the method mentioned above.

In a fourth aspect, this application provides a computer-readable storage medium, comprising a program run on a computer device, wherein the program is configured or programmed to implement the method mentioned above.

Compared with the prior art, this disclosure has the following beneficial effects.

With regard to the method provided herein, by means of energy storage equipment or wind or photovoltaic power units, the active power disturbance is injected into the power system to obtain frequency response characteristics of the power system through an appropriate control strategy, so as to propose an evaluation framework of the inertia and frequency regulation performance of the power system. Based on the evaluation framework, a non-intrusive equivalent frequency response model is established based on the impedance response of the active power disturbance injection node to evaluate the inertia level of the power system and the frequency regulation capability of various power-supply units without the need for large-disturbance events or PMU-based parameter identification. This application provides a reference for the precise regulation of the inertia and frequency regulation capability of the low-inertia power system, and can effectively prevent the system instability caused by low inertia level and insufficient frequency regulation capability under the exposure to the large-capacity active-power impact such as HVDC mono-pole/bi-pole block and disconnection of renewable energy, ensuring the safe and stable operation of the low-inertia power system.

DETAILED DESCRIPTION OF EMBODIMENTS

Figure 1:
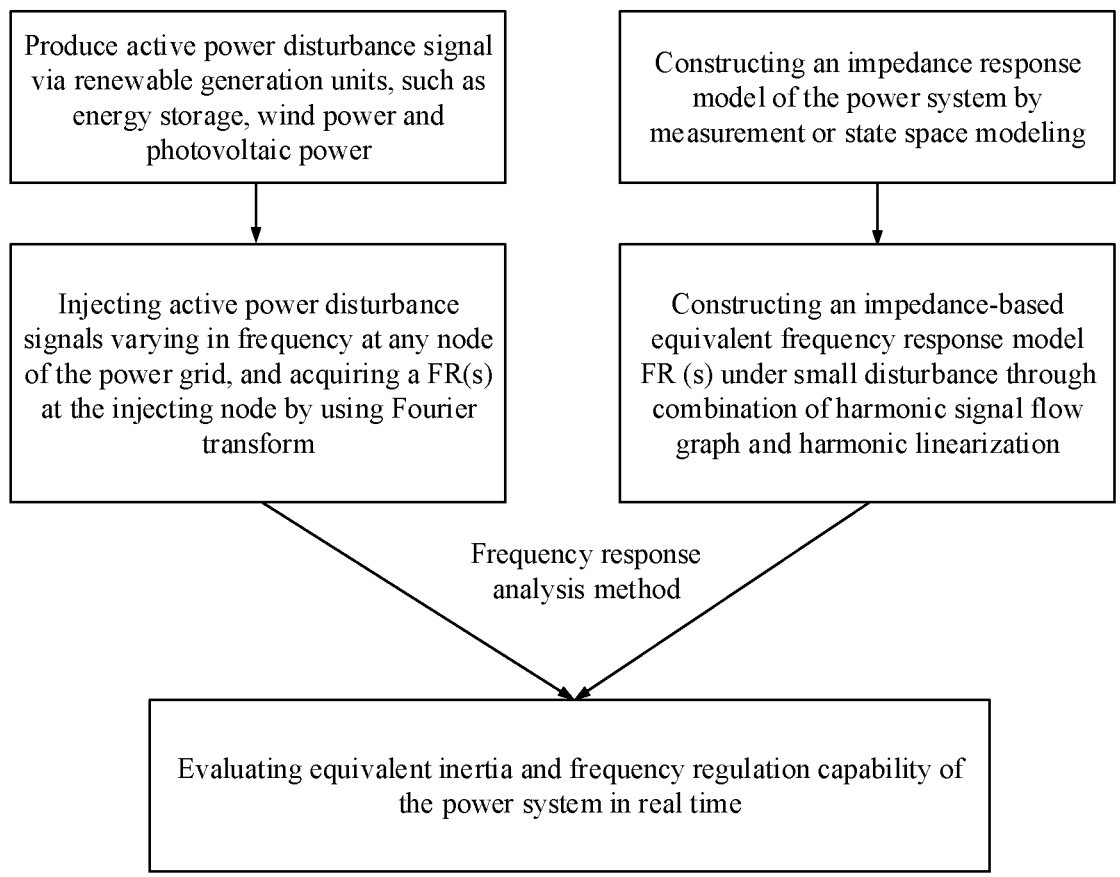
FIG. 1 is a flowchart of a method for evaluating inertia of a power system according to an embodiment of this application.

This application provides a method for evaluating inertia of a power system, which does not rely on large-disturbance events, and merely needs impedance response to equivalently characterize frequency response characteristics of the power system, so as to evaluate the inertia level of the power system and the frequency regulation capability of various kinds of power-supply units.

The method is specifically performed as follows.

1) An active power disturbance is injected into the power system using a non-synchronous power supply, such as energy storage, and is expressed as:

$$P(t)=P_0+P_m \cos(2\pi f_r t+\varphi_p)$$

Frequency at a node where the active power disturbance is injected is expressed as: $f(t)=f_0+f_m \cos(2\pi f_r t+\varphi_f)$, where $P_0$ is an output power of the non-synchronous power supply under normal operation, $f_0$ is a rated frequency of the non-synchronous power supply in the power system under normal operation, $P_m$ is a magnitude of a cosine term $P_m \cos(2\pi f_r t+\varphi_p)$ of an active power disturbance, $\varphi_p$ is a phase angle of the cosine term $P_m \cos(2\pi f_r t+\varphi_p)$ of the active power disturbance, $f_m$ is a magnitude of a frequency cosine term $f_m \cos(2\pi f_r t+\varphi_f)$, $\varphi_f$ is a phase angle of a frequency cosine term $f_m \cos(2\pi f_r t+\varphi_f)$, and $f_r$ is a disturbance frequency of the active power disturbance.

2) A first frequency response function FR(s) is acquired according to Fourier transform, and the first frequency response function FR(s) is expressed as FR(s) $F[f_r]/P[f_r]$; where $s=j2\pi f_r$; $F[f_r]=0.5f_m \exp(j\varphi_f)$; $F[f_r]$ is a Fourier component corresponding to a frequency f(t) under the disturbance frequency $f_r$, $P[f_r]$ is a Fourier component corresponding to the active power disturbance P(t) under the disturbance frequency $f_r$. A Bode diagram of the first frequency response function FR(s) of the power system under the active power disturbance is acquired to obtain a resonance point and a DC gain $K_{DC\_gain}$. An inertia level of the power system is determined according to the resonance point (the lowest point of the magnitude response), and the frequency regulation capability of the power system is determined according to the DC gain $K_{DC\_gain}$.

3) Combining with a relationship among active power disturbance, frequency fluctuation and impedance, a non-intrusive frequency response transfer function equivalent model based on impedance is established, that is, a second frequency response function FR (s) of the power system is equivalently characterized by the impedance response, so as to evaluate the inertia and frequency regulation capability of the non-intrusive power system based on impedance according to the evaluation framework in step 2).

In this embodiment, the inertia level of the power system and the frequency regulation capability of various kinds of power-supply units are evaluated through the equivalent impedance response of the node where the power supply is connected, which are obtained by measuring or equivalently calculating, without relying on the large disturbance events in the power system.

In step 1), an active power disturbance is injected into the power system using a non-synchronous power supply such as energy storage, which is taken as an active power disturbance signal. The active power disturbance signal is configured to use a grid-following converter, which fails to simulate or control virtual inertia, and enables to flexibly adjust an output power. The non-synchronous power supply is configured to adopt a double-loop control structure. An outer loop of the double-loop control structure is configured to perform a constant-power control, where a power control model is expressed as $$i_{dref} = \frac{2P_{ref}}{3u_{sd}},$$

and $i_{qref}=0$. An inner loop of the double-loop control structure is configured to perform a current control, where a current control model is expressed as $i_d(s)=G_i(s)i_{dref}$. The phase-locked loop is achieved by q-axis phase-locking, where a relation between an output angle of the phase-locked loop and an input q-axis voltage is expressed as:

$$\Delta\theta_{PLL}(s) = \frac{H_{PLL}(s)/s}{1+U_1 H_{PLL}(s)/s} u_{sq},$$

where $P_{ref}$ is a reference value of an input active power disturbance, $i_{dref}$ is a d-axis current reference value, and $i_{qref}$ is a q-axis current reference value, $G_i(s)$ is the closed-loop gain of the current control, and is expressed as $$G_i(s) = \frac{(s*K_p^c + K_i^c)/(s*(R_c+s*L_c))}{1+(s*K_p^c + K_i^c)/(s*(R_c+s*L_c))},$$

and $H_{PLL}(s)$ is the transfer function of the phase-locked loop, and is expressed as $$H_{PLL}(s) = K_p^{pll} + \frac{K_i^{pll}}{s}, s = j2\pi f_r,$$

$U_1$ is grid voltage at the PCC, $u_{sd}$ is the d-axis component of the grid voltage at the PCC, $u_{sq}$ is a q-axis component of the grid voltage at the PCC, and $\Delta\theta_{PLL}(s)$ is an angle variation of the grid voltage at the PCC, $K_p^c$ is a proportion coefficient of the current-control loop, $K_i^c$ is an integration coefficient of the current-control loop, $K_p^{pll}$ is a proportion coefficient of the phase-locked loop, $K_i^{pll}$ is an integration coefficient of the phase-locked loop, $R_c$ is a resistance at the PCC, and $L_c$ is an inductance at the PCC.

The step 2) is specifically performed as follows.

4.1) An input active power disturbance signal and an output frequency signal corresponding to it are subjected to Fourier transformed to obtain a first frequency response function calculation model of the power system, which is expressed as $FR(s) \equiv F[f_r]/P[f_r]$, where $s=j2\pi f_r$, $F[f_r]=0.5f_m \exp(j\varphi_f)$; and $P[f_r]=0.5P_m \exp(j\varphi_p)$. $F[f_r]$ is a Fourier component corresponding to a frequency $f(t)$ at the PCC under the disturbance frequency $f_r$, $P[f_r]$ is a Fourier component corresponding to an active power disturbance $P(t)$ at the PCC under the disturbance frequency $f_r$. The magnitude and phase angle of the frequency response of the power system in a certain frequency range is obtained via frequency sweeping, so as to obtain a corresponding Bode diagram of the frequency response of the power system, and obtain a resonance point.

4.2) The inertia of the power system is evaluated according to the resonance point on the Bode diagram and the equivalent inductance of the power grid, and the frequency regulation capability of the power system is evaluated according to the frequency response DC gain $K_{DC\_gain}$. The resonance point can be understood as a resonance occurred between the inertia (capacitive) of the power system and an equivalent inductance (inductive) of the power line, such that $C_{eq}^H$ is an equivalent capacitance characterized by the inertia of the power system, and is expressed as $$C_{eq}^H = \frac{1}{4\pi^2 f_x^2 L_{eq}},$$

where $L_{eq}$ is the equivalent inductance of the of power lines of the power system; and $f_x$ is a resonance frequency, such that the inertia level $H_{sys}$ of the power system is determined through the following formulas:

$$C_{eq}^H \cdot \frac{df}{dt} = \Delta P \text{ and } \frac{2H_{sys}S_{sys}}{f_0} \cdot \frac{df}{dt} = \Delta P.$$

Frequency regulation capability of the power system is indirectly demonstrated through $K_{DC\_gain}$ (mHz/MW), where a quasi-stable-state frequency deviation $\Delta f_{ss}$ of the power system is expressed as $\Delta f_{ss} = K_{DC\_gain} * \Delta P$.

The step 3) is specifically performed as follows.

5.1) By means of harmonic linearization method combined with the harmonic signal flowchart, a second frequency response function of the power system is expressed as follows:

$$FR(s) = -\frac{sj}{2\pi u_{sd}} T_{PLL}(s) G_i(s) \frac{2}{3u_{sd}} \cdot \frac{1}{2} [Z_{pp}(s) + Z_{pn}(s) - Z_{np}(s) - Z_{nn}(s)],$$

where $$T_{PLL}(s) = \frac{U_1 H_{PLL}(s)/s}{1+U_1 H_{PLL}(s)/s}; T_{PLL}(s)$$

is a gain of the phase-locked closed-loop, $Z_{pp}(s)$ is a positive sequence impedance in the sequence domain of the power system at the node where the active power disturbance is injected, $Z_{nn}(s)$ is a negative sequence impedance in the sequence domain of the power system at the node where the active power disturbance is injected, $Z_{pn}(s)$ is a positive sequence versus negative sequence coupling impedance in the sequence domain of the power system at the node where the active power disturbance is injected, and $Z_{np}(s)$ is a negative sequence versus positive sequence coupling impedance in the sequence domain of the power system at the node where the active power disturbance is injected.

5.2) According to a conversion relationship between the sequence domain and the dq domain is expressed as $$\begin{bmatrix} Z_{dd}(s) & Z_{dq}(s) \\ Z_{qd}(s) & Z_{qq}(s) \end{bmatrix} = T^{-1} \begin{bmatrix} Z_{pp}(s) & Z_{pn}(s) \\ Z_{np}(s) & Z_{nn}(s) \end{bmatrix} T,$$

where $Z_{dd}(s)$ is a coupling impedance between the d-axis and the d-axis of the power system in the dq domain at the node where the active power disturbance is injected, $Z_{dq}(s)$ is a coupling impedance between the q-axis and the q-axis of the power system in the dq domain at the node where the active power disturbance is injected, $Z_{qd}(s)$ is a coupling impedance between the q-axis and the d-axis of the power system in the dq domain at the node where the active power disturbance is injected, $Z_{qq}(s)$ is a coupling impedance between the q-axis and the q-axis of the power system in the dq domain at the node where the active power disturbance is injected, such that the second frequency response function in step 5.1) is simplified into:

$$FR(s) \equiv \frac{T_{PLL}(s)G_i(s)Z_{qd}(s)}{2\pi u_{sd}^2},$$

where a conversion matrix is expressed as $$T = \begin{bmatrix} 1 & j \\ 1 & -j \end{bmatrix}.$$

If it is further assumed that an input frequency of the active power disturbance is less than the bandwidth of the phase-locked loop, the second frequency response function FR (s) can be further expressed as:

$$FR(s) \approx \frac{3s}{4\pi u_{sd}^2} Z_{qd}(s), \ f_r < f_{PLL\_BW}.$$

In engineering practice, the coupling impedance of the q-axis and the d-axis can be obtained through measurement or small signal modeling, which is supported in an article (Yunjie Gu, Yitong Li, YueZhu, Timothy C. Green. Impedance-Based Whole-System Modeling for a Composite Grid via Embedding of Frame Dynamics[J]. *IEEE TRANSACTIONS ON POWER SYSTEMS*, 2020, 1-10.)

5.3) As illustrated in the frequency response equivalent function FR(s) of the power system obtained in 5.2), the frequency response function of the power system under the injection of the disturbance is characterized using the coupling impedance between the q-axis and d-axis of the power system, so as to evaluate the contribution of various power generation units on the inertia and frequency regulation capability of the power system using the impedance response model.

Figure 2:
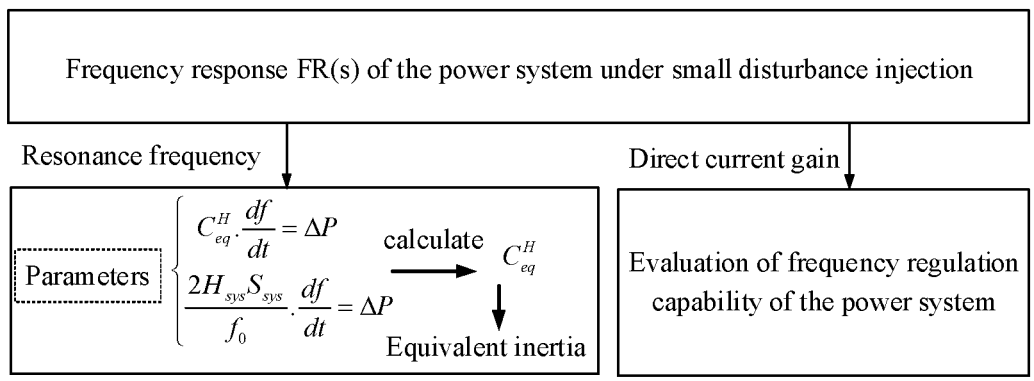
FIG. 2 schematically illustrates a framework for evaluating inertia and frequency regulation capability of a power system based on frequency response according to an embodiment of this application.

As shown in FIG. 1, the method provided herein uses non-synchronized power sources such as energy storage or wind power/photovoltaic power, and adopts appropriate control methods to inject cosine active power disturbance into the power system to obtain the second frequency response function FR(s) at the node where the disturbance is injected in the power system. According to the analysis block diagram of the frequency response shown in FIG. 2, the inertia and of the power system and the frequency regulation capability of the non-synchronous power supply are evaluated.

This embodiment is specifically performed as follows.

Figure 3:
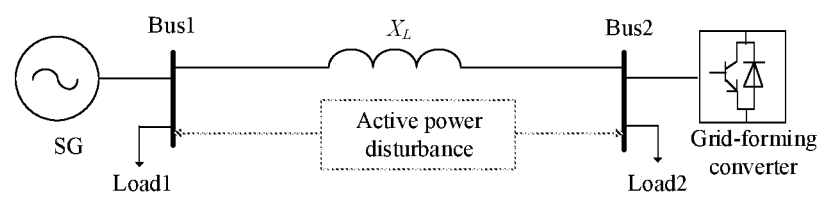
FIG. 3 structurally shows a system for evaluating inertia of a power system in simulation according to an embodiment of this application.
Figure 4A:
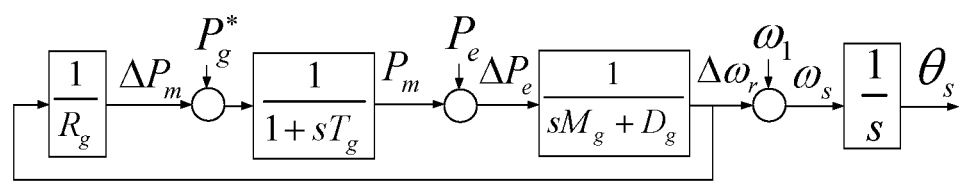
FIG. 4a is a schematic diagram of a synchronous power generation model according to an embodiment of this application.
Figure 4B:
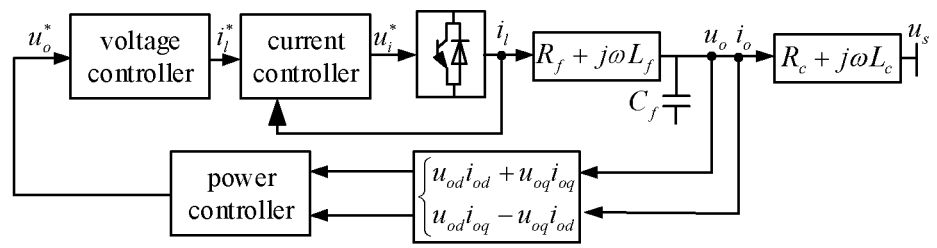
FIG. 4b is a schematic diagram of a voltage tracking converter model according to an embodiment of this application.
Figure 5:
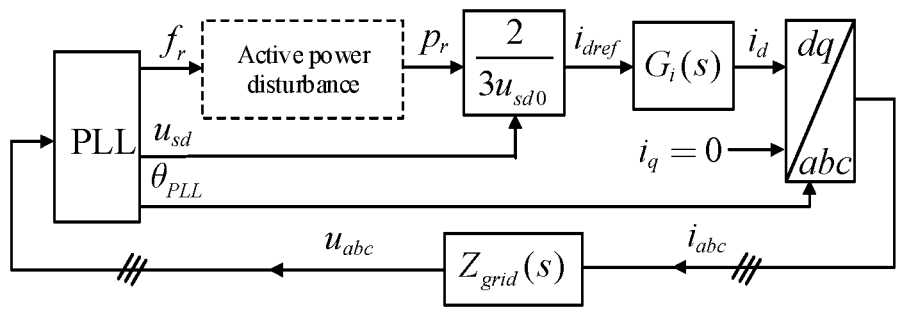
FIG. 5 is a block diagram depicting the injection of an active power disturbance according to an embodiment of this application.
Figure 6:
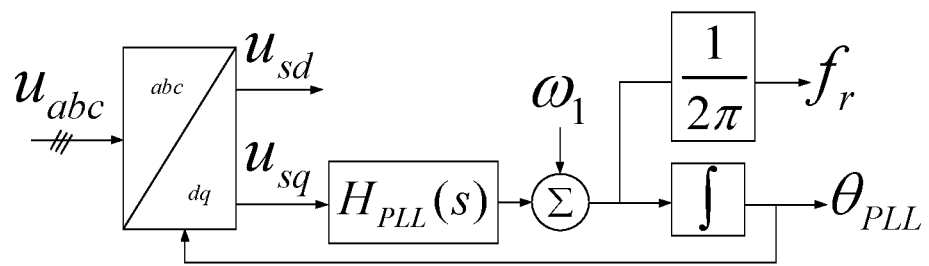
FIG. 6 is a block diagram of the active power disturbance phase-locked loop (PLL) according to an embodiment of this application.

As shown in FIG. 3, a two-machine power system consisting of a traditional synchronous power generator, a voltage structural converter and corresponding loads is established in a MATrix LABoratory (Matlab)/Simulink software. The synchronous power generator is shown in FIG. 4(*a*), and the main parameters of the synchronous power generator is illustrated in Table 1. The converter model is shown in FIG. 4(*b*), and the main parameters of the converter model is illustrated in Table 2. In this embodiment, the active power disturbance is a grid-following converter based on PLL, whose block diagram is shown in FIG. 5. In addition, the phase-locked loop is designed to track the q-axis voltage, and obtain the frequency of the power system via a proportional integral controller. The block frame of controlling the active power disturbance phase-locked loop (PLL) is shown in FIG. 6.

TABLE 1

Main parameters of synchronous power generator

| Parameter | Value |
| --- | --- |
| Inertia time constant (H) | 10 |
| Damping coefficient (D) | 5 |
| Time coefficient of speed controller ($T_g$) | 0.5 |
| Droop coefficient of speed controller ($R_g$) | 0.02 |
| Electrical impedance of power generator ($Z_{St}$) | 0.01 + j0.02 |

TABLE 2

Main parameters of voltage structural converter

| Parameter | Value |
| --- | --- |
| Rated angular frequency of power system ($\omega_0$) | 314.159 |
| Output filter inductance ($L_f$) | 0.05/314.159 |
| Output filter resistance ($R_f$) | 0.01 |
| Output filter capacitance ($C_f$) | 0.02/314.159 |
| Impedance of connection between converter and power grid ($Z_C$) | 0.02 + j0.01 |
| Droop control coefficient under active power disturbance ($K_{Dp}$) | 0.02 |
| Bandwidth under alternating voltage control | 250 |
| Bandwidth under alternating current control | 500 |

Figure 7:
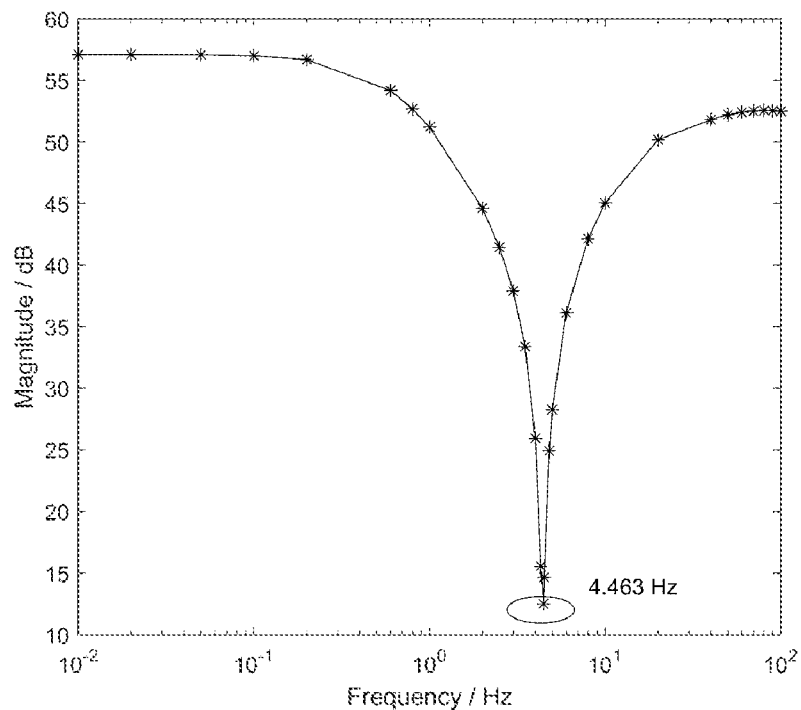
FIG. 7 shows frequency response FR(s) at bus 1 where the active power disturbance is injected.

It is demonstrated in FIG. 5, if the active power disturbance, which is expressed as: f(t)=$f_0$+$f_m$ cos(2π$f_r$t+$\varphi_f$), with the injection frequency $f_r$ is injected into the power system at bus 1, the injected active power disturbance generates a frequency response with an oscillation frequency $f_r$, which is expressed as: f(t)=$f_0$+$f_m$ cos(2π$f_r$t+$\varphi_f$), and then a Bode diagram of the frequency response transfer function FR (s) at the node where the active power disturbance is injected is obtained combined with Fourier transform, which is shown in FIG. 7.

A verification of evaluating the inertia in the power system is shown as follows.

It can be illustrated from FIG. 7 that the frequency response magnitude of the power system is the smallest at a frequency of 4.463 Hz, which is resulted from a resonance occurred between the capacitive of the inertia of the power system and equivalent inductance of the power line. According to the evaluation framework of the inertia of the power system in FIG. 2, it is assumed that only the influence of the inertia of the power system is considered, $C_{eq}^H$ (Capacitive impedance characterized by the inertia of the power system) in the system provided herein is obtained as 0.789 by combining with the relevant parameters of the power system, such that the time constant of the inertia of the power system is obtained as 9.8625 s, and the error between the time constant of the inertia of the power system and the true value of the time constant of the inertia of the power system is only 1.375%. Thus, the inertia level of the power system evaluated by the method provided herein can accurately evaluate the inertia level of the power system.

A verification of the evaluation of the frequency regulation capability in the power system is shown as follows.

Figure 8:
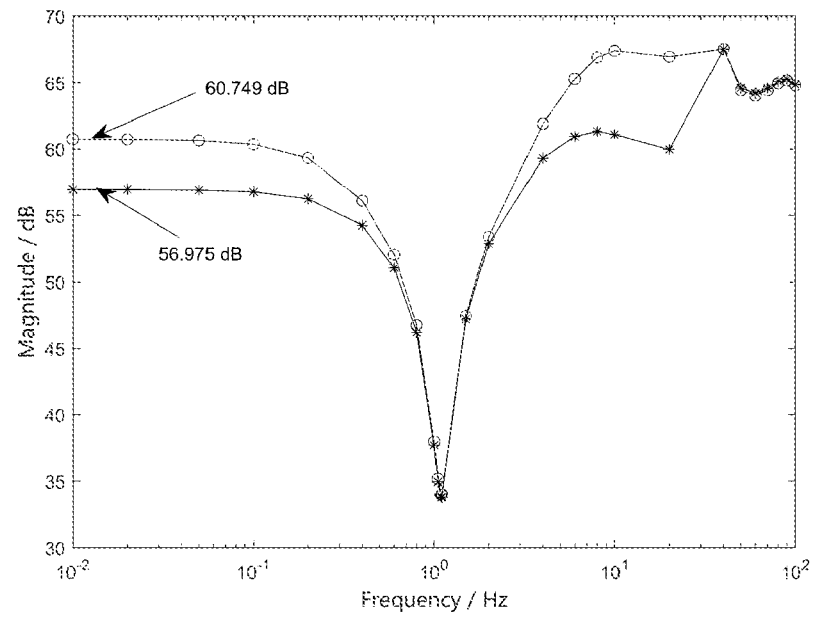
FIG. 8 shows frequency response FR(s) at bus 2 where the active power disturbance is injected under different droop control coefficients of a converter.
Figure 9:
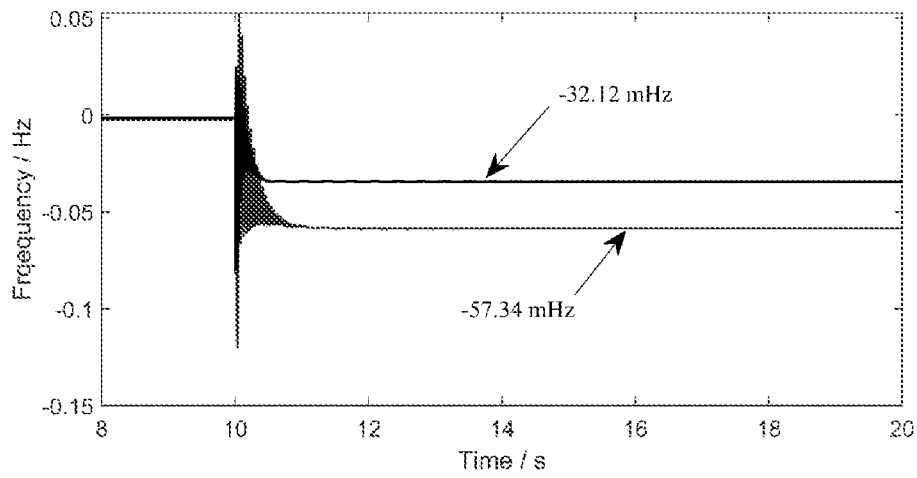
FIG. 9 illustrates frequency deviation simulation results under the active power disturbance of 0.05 pu.

As shown in FIG. 8, when the active power disturbance is injected at bus 2, the frequency response characteristics of the power system under different droop gains of the grid-forming converter are illustrated. It can be illustrated from FIG. 8 that when the droop gain of the grid-forming converter $K_{Dp}$ is 0.02, the corresponding DC gain of the frequency response FR (s) of the power system is 56.975 dB, such that when the load of the power system suddenly increases by 0.05 pu, the quasi-stable-state frequency deviation of the power system is calculated as 35.295 mHz according to the DC gain $K_{DC\_gain}$. And when the droop gain of the grid-forming converter $K_{Dp}$ is 0.04, the corresponding DC gain of frequency response of the power system is 60.749 dB, such that when the load of the power system suddenly increases by 0.05 pu, the quasi-stable-state frequency deviation of the power system is calculated as 57.5 mHz according to the DC gain $K_{DC\_gain}$. Compared with the simulation results of the Simulink software shown in FIG. 9, when the droop gain of the grid-forming converter $K_{Dp}$ is 0.02, the quasi-stable-state frequency deviation of the power system is 37.12 mHz under time-domain simulation, and when the droop gain of the grid-forming converter $K_{Dp}$ is 0.04, the quasi-stable-state frequency deviation of the power system is 57.34 mHz under time-domain simulation. Therefore, the DC gain of the frequency response FR (s) is capable of accurately evaluating the frequency regulation capability of the system/equipment.

Figure 10:
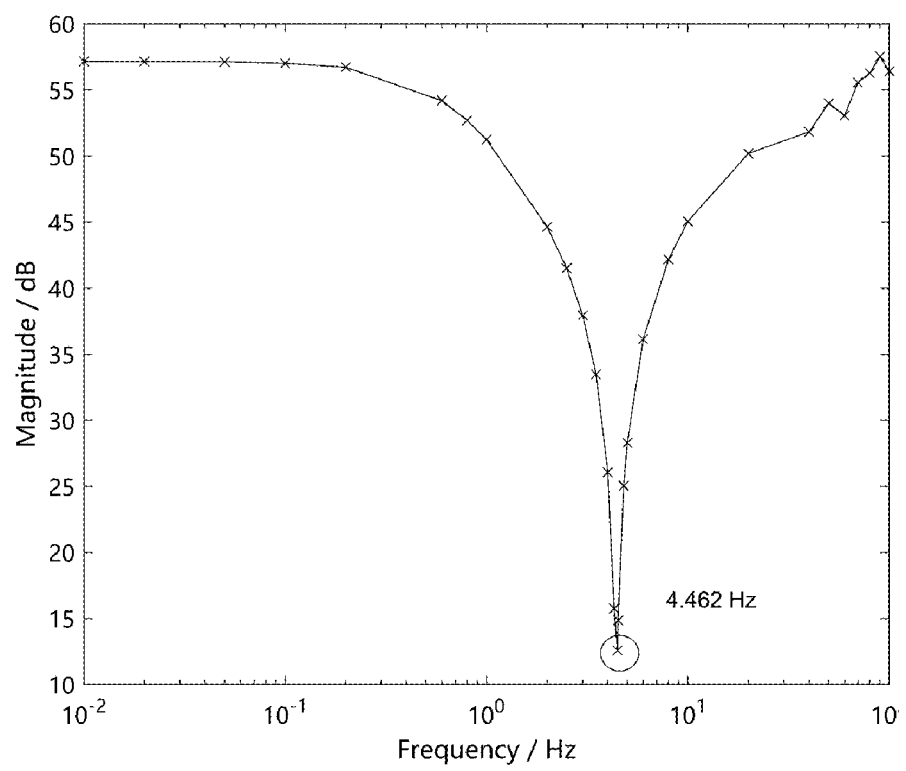
FIG. 10 shows $Z_{qd}(s)$ response of the system at the bus 1 under the active power disturbance.

An equivalent verification of the frequency response of the power system based on impedance is shown as follows. By comparing with FIG. 10 and FIG. 7, it can be illustrated that the curve in FIG. 10 and a curve in FIG. 7 are almost the same in the low frequency range, and have almost the same resonance frequency. The DC gain on the two curves is also approximately equal. It can be seen that the frequency response equivalent model of the power system based on impedance can well characterize the actual frequency response process of the power system, and thus the inertia and the frequency regulation capability of the power system can be evaluated by obtaining the impedance response under the disturbance injection. In engineering practice, the impedance response is easier to be obtained, such that the method provided herein is extremely recommended in practical engineering with strong practicability.

What is claimed is:

1. A method for evaluating inertia of a power system, comprising:
   (S1) injecting active power disturbance signals varying in frequency into the power system at a node in a power grid, wherein at time t, the active power disturbance signals are each expressed as:

$$P(t)=P_0+P_m \cos(2\pi f_r t+\varphi_p);$$

Wherein $P_0$ is an output power of a non-synchronous power supply under normal operation; $P_m$ is a magnitude of a cosine term $P_m \cos(2\pi f_r t+\varphi_p)$ of an active power disturbance; $\varphi_p$ is a phase angle of the cosine term $P_m \cos(2\pi f_r t+\varphi_p)$ of the active power disturbance; and $f_r$ is a disturbance frequency of the active power disturbance; and acquiring a first frequency response function FR(s) of the power system at a point of common coupling (PCC) where the active power disturbance is injected according to Fourier transform, or equivalently characterizing a second frequency response function FR(s) of the power system according to impedance response;
   wherein the first frequency response function FR(s) is expressed as: $FR(s) \equiv F[f_r]/P[f_r]$;
   wherein $s=j2\pi f_r$; $F[f_r]=0.5 f_m \exp(j\varphi_f)$; $P[f_r]=0.5 P_m \exp(j\varphi_p)$; $F[f_r]$ is a Fourier component corresponding to a frequency f(t) at the PCC under the disturbance frequency $f_r$; $P[f_r]$ is a Fourier component corresponding to an active power disturbance P(t) at the PCC under the disturbance frequency $f_r$; and $f(t)=f_0+f_m \cos(2\pi f_r t+\varphi_f)$, wherein $f_0$ is a rated frequency of the power system under normal operation, $f_m$ is a magnitude of a frequency cosine term $f_m \cos(2\pi f_r t+\varphi_f)$ at the PCC, $\varphi_f$ is a phase angle of the frequency cosine term $f_m \cos(2\pi f_r t+\varphi_f)$ at the PCC, and j is an imaginary unit in a complex field; or the second frequency response function FR(s) is expressed as:

$$FR(s) \equiv \frac{s}{2\pi u_{sd}} T_{PLL}(s) G_i(s) \frac{1}{u_{sd}} Z_{qd}(s);$$

$$R(s) \approx \frac{3s}{2\pi u_{sd}^2} Z_{qd}(s), f_r < f_{PLL\_BW};$$

wherein $$T_{PLL}(s) = \frac{U_1 H_{PLL}(s)/s}{1+U_1 H_{PLL}(s)/s}; Z_{qd}(s)$$

is a coupling impedance between a q-axis and a d-axis of the power system in a dq reference frame at the PCC; $G_i(s)$ is the closed-loop gain of the current control; $H_{PLL}(s)$ is a transfer function of a phase-locked loop; $s=j2\pi f_r$; $u_{sd}$ is a d-axis component of a grid voltage at the PCC; $f_{PLL\_BW}$ indicates phase-locked loop bandwidth; and $U_1$ is the grid voltage at the PCC; and (S2) acquiring a Bode diagram of the first frequency response function FR(s) or the second frequency response function FR(s) to obtain a resonance point and a direct current (DC) gain $K_{DC\_gain}$; and determining an inertia level $H_{sys}$ of the power system according to the resonance point and the DC gain $K_{DC\_gain}$ through the following formulas:

$$C_{eq}^H \cdot \frac{df}{dt} = \Delta P \text{ and } \frac{2 H_{sys} S_{sys}}{f_0} \cdot \frac{df}{dt} = \Delta P;$$

wherein $C_{eq}^H$ is an equivalent capacitance characterized by an inertia of the power system, and is expressed as $$C_{eq}^H = \frac{1}{4\pi^2 f_x^2 L_{eq}}; L_{eq}$$

is an equivalent inductance of power lines of the power system; $f_x$ is a resonance frequency; $\Delta P$ is an unbalanced active power of the power system; and $S_{sys}$ is a rated capacity of the power system.

2. The method of claim 1, wherein in step (S1), the active power disturbance signals are injected into the power system by using a non-synchronous power supply, wherein the active power disturbance has a double-loop control structure; an outer loop of the double-loop control structure is configured to perform a power control, wherein a power control model is expressed as $$i_{dref} = \frac{2 P_{ref}}{3 u_{sd}},$$

and $i_{qref}=0$; an inner loop of the double-loop control structure is configured to perform a current control, wherein a current control model is expressed as $i_d(s)=G_i(s) i_{dref}$ the phase-locked loop is achieved by q-axis phase-locking, wherein a relation between an output angle of the phase-locked loop and an input q-axis voltage is expressed as $$\Delta\theta_{PLL}(s) = \frac{H_{PLL}(s)/s}{1 + U_1 H_{PLL}(s)/s} u_{sq};$$

wherein $P_{ref}$ is a reference value of an input active power disturbance; $i_{dref}$ is a d-axis current reference value, and $i_{qref}$ is a q-axis current reference value; $G_i(s)$ is the closed-loop gain of the current control; $P_{PLL}(s)$ is the transfer function of the phase-locked loop; $s=j2\pi f_r$; $U_1$ is the grid voltage at the PCC; $u_{sd}$ is the d-axis component of the grid voltage at the PCC; $u_{sq}$ is a q-axis component of the grid voltage at the PCC; and $\Delta\theta_{PLL}(s)$ is an angle variation of the grid voltage at the PCC.

3. The method of claim 1, wherein the step (S2) further comprises:

evaluating frequency regulation capability of the power system according to the DC gain $K_{DC\_gain}$, wherein a quasi-stable-state frequency deviation $\Delta f_{ss}$ of the power system is expressed as $\Delta f_{ss}=K_{DC\_gain}*\Delta P$, wherein $\Delta P$ is the unbalanced active power of the power system.

4. A system for evaluating inertia of a power system, comprising:

a computer device;

wherein the computer device is configured or programmed to implement the method of claim 1.

5. A system for evaluating inertia of a power system, comprising: a computer device;

wherein the computer device is configured or programmed to implement the method of claim 3.

6. A non-transitory computer-readable storage medium, comprising:

a program runnable on a computer device;

wherein the program is configured or programmed to implement the method of claim 1.

* * * * *